(12) United States Patent
Michelson et al.

(10) Patent No.: US 11,232,406 B1
(45) Date of Patent: Jan. 25, 2022

(54) CREATING TRACKED ISSUE USING ISSUE-CREATION EMOJI ICON

(71) Applicants: Atlassian Pty Ltd., Sydney (AU); Atlassian Inc., San Francisco, CA (US)

(72) Inventors: David Michelson, San Francisco, CA (US); Vitalii Saienko, Lviv (UA); Trevor Thompson, Austin, TX (US); Fletcher Richman, Austin, TX (US); Tristan Rubadeau, Austin, TX (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/154,917

(22) Filed: Jan. 21, 2021

(51) Int. Cl.
| | |
|---|---|
| *G06Q 10/10* | (2012.01) |
| *H04L 12/58* | (2006.01) |
| *G06F 40/174* | (2020.01) |
| *G06F 8/10* | (2018.01) |
| *G06F 17/00* | (2019.01) |

(52) U.S. Cl.
CPC ......... *G06Q 10/103* (2013.01); *G06F 40/174* (2020.01); *G06Q 10/101* (2013.01); *H04L 51/10* (2013.01); *H04L 51/16* (2013.01); *H04L 51/18* (2013.01); *G06F 8/10* (2013.01)

(58) Field of Classification Search
CPC .. G06Q 10/103; G06Q 10/101; G06F 40/174; G06F 8/10; H04L 51/10; H04L 51/18; H04L 51/16
See application file for complete search history.

(56) References Cited

U.S. PATENT DOCUMENTS

| | | | |
|---|---|---|---|
| 9,906,471 B1 * | 2/2018 | Rensburg | G06F 40/166 |
| 2016/0291822 A1 * | 10/2016 | Ahuja | H04L 51/32 |
| 2017/0185581 A1 * | 6/2017 | Bojja | G06K 9/6269 |
| 2017/0285881 A1 * | 10/2017 | Crusson | G06F 9/451 |

* cited by examiner

*Primary Examiner* — Quoc A Tran
(74) *Attorney, Agent, or Firm* — Brownstein Hyatt Farber Schreck, LLP

(57) ABSTRACT

The issue-discovery services described herein may access data from the messaging platform and/or the issue-tracking platform to automatically determine issue attributes for creating a new issue in the issue-tracking platform based on activity in the messaging platform. The issue-discovery service may provide or otherwise be associated with a user input element presented on a client device (e.g., presented in the chat user interface), which allows a user of the client device to provide a user input to create a new issue in the issue-tracking platform based on activity in the chat channel. The user input may identify content associated with the chat channel (e.g., one or more messages displayed in the chat user interface) for use in creating the new issue in the issue-tracking platform.

14 Claims, 8 Drawing Sheets

CREATING TRACKED ISSUE USING ISSUE-CREATION EMOJI ICON

TECHNICAL FIELD

Embodiments described herein relate to issue-discovery services and related methods for creating or modifying issues in an issue-tracking platform based on messaging activity of a messaging platform.

BACKGROUND

Users of messaging platforms may exchange information about projects, products, tasks, events, and the like that are or should be tracked using an issue-tracking platform. Traditional solutions for creating or modifying issues in the issue-tracking platform based on activity in the messaging platform, such as manually creating issues in the issue-tracking platform, are inconvenient and time-consuming, because, in many cases, a user must manually select issue attributes for the issue to make sure it is properly integrated with other issues and issue groups the issue-tracking platform. As a result, in many instances, users either do not create or modify issues based on messaging platform activity or they create issues improperly (e.g., without proper issue attributes). These improperly created issues may not be seen by the appropriate users of the issue-tracking platform, or they may create confusion and extra work for users of the issue-tracking platform.

SUMMARY

Embodiments of the systems, devices, methods, and apparatuses described in the present disclosure are directed to creating or modifying issues in an issue-tracking platform based on messaging activity of a messaging platform.

Example embodiments may include a method for creating a new issue for an issue-tracking platform during a real-time chat session using an emoji icon. The method includes the steps of during the real-time chat session in a chat channel, receiving a first user input causing a display of an array of emoji icons including an issue-creation emoji icon and receiving a selection of the issue-creation emoji icon. The method further includes the step of in response to the selection of the issue-creation emoji icon, instantiating an instance of the issue-discovery service. The method further includes the steps of extracting, by the issue-discovery service, chat channel data of the chat channel. The chat channel data may include a first portion of content from the real-time chat session. The method further includes the steps of accessing the issue-tracking system and identifying one or more predicted issue attributes for the new issue using the first portion of the content. The method further includes the steps of displaying an is sue-discovery user interface having a set of user-editable fields and prepopulating a first user-editable field using the one or more predicted issue attributes. The method further includes the steps of receiving second user input in one or more user-editable fields of the set of user-editable fields and receiving a third user input in the issue-discovery user interface, causing the new issue to be created in the issue-tracking platform. The new issue may have issue attributes that are based, at least in part, on content contained in the set of user-editable fields.

Example embodiments may further include a method for using an issue-discovery service to determine issue attributes for a new issue in an issue-tracking platform based on messaging activity of a messaging platform. The method includes the steps of receiving, in a chat user interface provided on a client device, a selection of an issue-creation emoji icon during a real-time chat session in a chat channel and in response to the selection of the issue-creation emoji icon, instantiate an issue-discovery service. The method further includes the step of accessing, by the issue-discovery service, chat channel data of the chat channel. The chat channel data may include a chronologically organized stream of messages exchanged among a set of chat channel participants. The method may further include the step of determining, by the is sue-discovery service, a set of predicted issue attributes for the new issue in the issue-tracking platform based at least in part on the stream of messages and the set of chat channel participants. The set of predicted issue attributes may include an issue title and a set of issue-tracking platform user identifiers. The method may further include the step of displaying, on the client device, an issue-discovery user interface of the issue-discovery service. The method may further include the steps of presenting the set of predicted issue attributes in the issue-discovery user interface, receiving a user input to the issue-discovery user interface, and in response to receiving the user input, causing the issue-tracking platform to create the new issue.

Example embodiments may still further include a system that includes a messaging platform, an issue-tracking platform, and an issue-discovery service communicably coupled to the messaging platform and the issue-tracking platform. The messaging platform may be configured to provide a chat user interface at a client device. The chat user interface may present a chronologically organized stream of messages of a chat channel of the messaging platform. The issue-tracking platform may be configured to manage a set of issues organized into one or more issue groups. The issue-discovery service may be configured to detect a selection of an issue-creation emoji icon from an array of emoji icons corresponding to a message displayed in the chat user interface and determine, based at least in part on contents of the message, predicted issue attributes for a new issue in the issue-tracking platform. The predicted issue attributes may include an issue title, an issue group, and an issue type. The issue-discovery service may be further configured to display an issue-discovery user interface on the client device. The issue-discovery user interface may include a first user-editable field prepopulated with the issue title, a second user-editable field prepopulated with the issue group, and a third user-editable field prepopulated with the issue type. The issue-discovery service may be further configured to receive a user input to the first user-editable field, the second user-editable field, or the third user-editable field. The user input may specify a modified issue attribute. The issue-discovery service may be further configured to provide actual issue attributes to the issue-tracking platform for creation of the new issue. The actual issue attributes may include the modified issue attribute.

In addition to the example aspects and embodiments described above, further aspects and embodiments will become apparent by reference to the drawings and by study of the following description.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
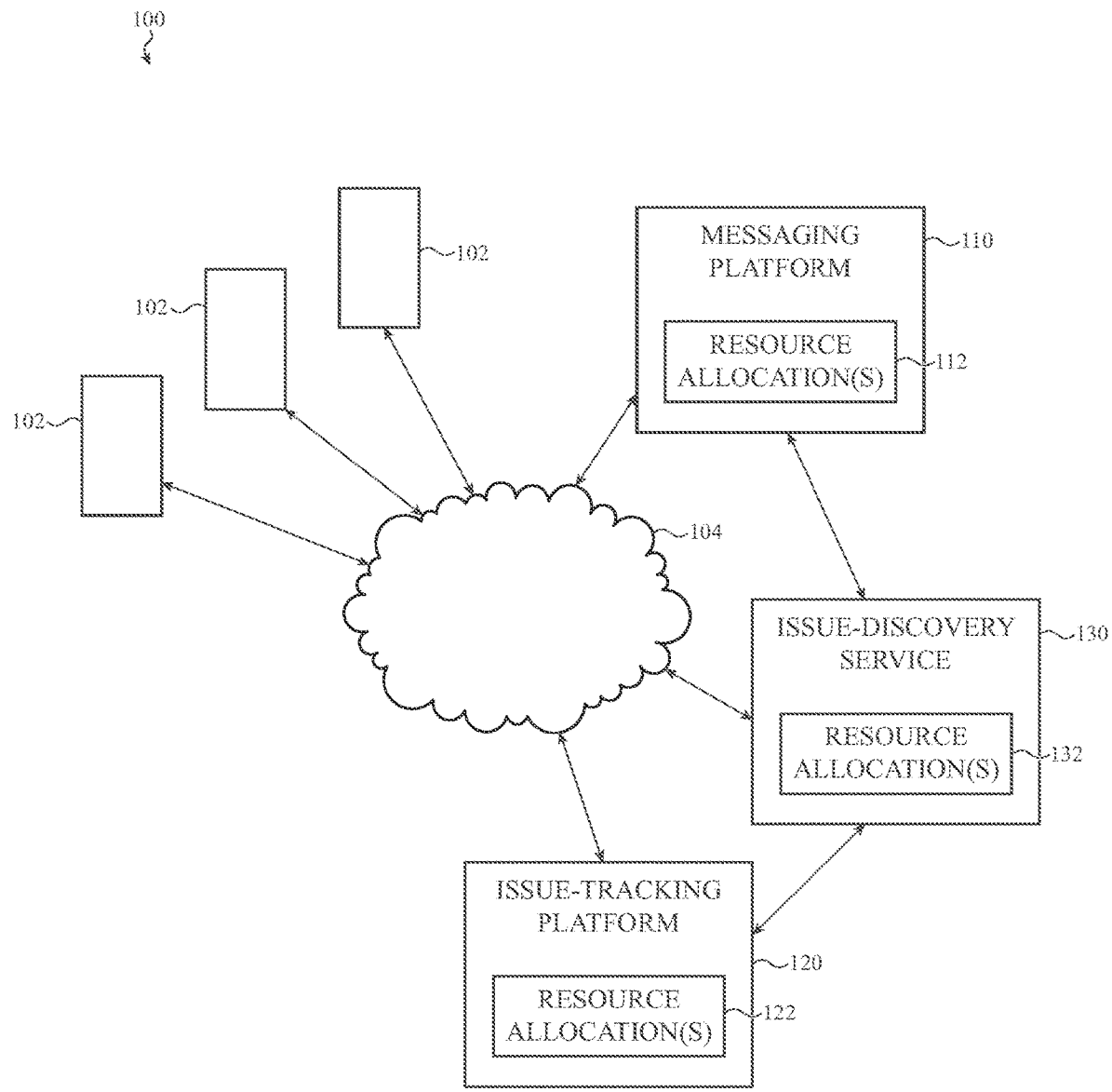
FIG. 1A depicts an example system that includes an issue-discovery service configured to create a new issue in an issue-tracking platform based on messaging activity of a messaging platform.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to issue-discovery services and related methods for creating a new issue in an issue-tracking platform based on chat channel activity of a messaging platform. An issue-discovery service may be communicably coupled to one or more issue-tracking platforms, one or more messaging platforms, and one or more client devices. The issue-tracking platform(s) may manage work items or "issues" (e.g., tasks, events, or other work items) for groups of users of the issue-tracking platform. The messaging platform may facilitate messaging among groups of users of the messaging platform. One or more users of the issue-tracking platform may be users of the messaging platform, and vice versa.

The issue-discovery service may access data from the messaging platform and/or the issue-tracking platform to automatically determine issue attributes for creating a new issue in the issue-tracking platform based on activity in a real-time chat session in a chat channel of the messaging platform. The issue-discovery service may provide or otherwise be associated with a user input element (e.g., an issue-creation emoji icon or other icon) presented in a chat user interface. The issue-discovery service may detect a user input (e.g., a selection of the issue-creation emoji icon), and in response, may create a new issue in the issue-tracking platform based on activity in the chat channel. The user input may identify content associated with the chat channel (e.g., the issue-creation emoji icon may be selected with respect to one or more messages displayed in the chat user interface) for use in creating the new issue in the issue-tracking platform.

Issues in the issue-tracking platform may be tasks, events, or other work items, and may be assigned to one or more issue groups of the issue-tracking platform. The issue-tracking platform may store issue configuration data related to the issues in the issue-tracking platform. The issue configuration data may include issue attributes for each issue stored by the issue-tracking platform. Issue attributes may include information (e.g., structured information) corresponding to an issue and/or relating the issue to other issues or issue groups in the issue-tracking platform. Examples of issue attributes include an issue title and/or description, issue groups to which the issue is assigned, users assigned to the issue, an issue type, an issue progress or status (e.g., not started, in progress, complete, waiting, etc.), relevant dates (e.g., deadlines, creation date, milestone dates, etc.), priority information (e.g., urgent, high priority, standard priority, low priority, etc.), and/or any other information relevant to the issue. In some cases, the issue attributes include one or more chat channels (e.g., chat channel(s) of a messaging platform) associated with the issue and/or issue groups to which the issue is assigned.

The messaging platform may provide functionality for facilitating the exchange of messages in one or more messaging groups or "chat channels". A chat channel may include messages (e.g., a chronologically organized stream of messages) exchanged among a group of two or more users of the messaging platform. The messaging platform may provide a chat user interface accessible by one or more client devices that allows a user of the messaging platform to view chat channel data for one or more chat channels for which the user is a participant. In some cases, the chat user interface includes a chronologically organized stream of messages of a chat channel. In some cases, the chat user interface may be a component of a larger program or service, such as a chat function provided in a video conference user interface.

In various embodiments, users of the messaging platform may exchange information about projects, products, tasks, events, and the like that are or should be tracked using the issue-tracking platform. Traditional solutions for creating or modifying issues in the issue-tracking platform based on activity in the messaging platform, such as manually creating issues in the issue-tracking platform, are inconvenient and time-consuming, because, in many cases, a user must manually select issue attributes for the issue to make sure it is properly integrated with other issues and issue groups the issue-tracking platform. As a result, in many instances, users either do not create or modify issues based on messaging platform activity or they create issues improperly (e.g., without proper issue attributes). These improperly created issues may not be seen by the appropriate users of the issue-tracking platform, or they may create confusion and extra work for users of the issue-tracking platform.

As noted above, the issue-discovery service may be instantiated in response to a user input received using a user input element provided on the client device. The user input element provided on the client device may include any suitable element or elements selectable by a user, including buttons, menu items, emoji, and the like. In some cases, the user input element is an issue-creation emoji icon that a user may select from an array of emoji icons, a menu, or another user interface element to apply the issue-creation emoji icon to one or more messages displayed in the chat user interface. The issue-discovery service may be capable of monitoring or being notified of activity within the chat user interface (at least user activity related to the user input element) to detect user inputs provided to the user interface via the user input element.

In response to detecting a user input provided to the chat user interface via the user input element, the issue-discovery service may determine issue attributes for the new issue in the issue-tracking platform. The issue-discovery service may access data from the messaging platform and/or the issue-tracking platform to determine the issue attributes. For example, the issue-discovery service may access chat channel data stored by the messaging platform and/or issue configuration data stored by the issue-tracking platform. The chat channel data may include content associated with the chat channel (e.g., message(s) or other content identified by the user input), users associated with the chat channel, configurable settings or attributes of the chat channel (e.g., a chat channel name, description, security policy, and other structured data fields associated with the chat channel), and the like. The issue configuration data may include issue attributes of existing issues in the issue-tracking platform, rules for configuring new issues, and the like.

The issue-discovery service may determine issue attributes for the new issue in a variety of ways. In some cases, the issue-discovery service identifies one or more issue groups for the new issue based on comparing chat channel data to issue configuration data. For example, the issue-discovery service may compare a channel name or description to issue group names and/or issue titles within issue groups. The issue-discovery service may select one or more issue groups having issue group names and/or issue titles that most closely match the compared channel name or description. The issue-discovery service may compare users of the chat channel to users of issue groups, and may select as a determined issue group an issue group with a set of associated users that most closely matches the users associated with the chat channel. Similarly, the issue-discovery service may determine users of the issue-tracking platform to assign to the new issue based on the users in the chat channel. In some cases, the issue-discovery service may analyze content (e.g., messages) of the chat channel to determine predicted issue attributes. In some cases, the issue configuration data may include keywords associated with issue groups or issues of the issue-tracking platform. The issue-discovery service may compare the contents of the chat channel to the keywords to identify one or more issue groups or other issue attributes for the new issue.

The issue-discovery user interface may present the set of predicted issue attributes for viewing and/or modification by the user of the client device. The issue-discovery user interface may include a set of user-editable fields corresponding to issue attributes. In various embodiments, the predicted issue attributes determined by the issue-discovery system may be used to prepopulate one or more of the user-editable fields. Users may view and/or modify the issue attributes using the user-editable fields. Users may provide an additional input, which causes the new issue to be created in the issue-tracking platform. The new issue may have issue attributes that are based, at least in part, on content contained in the set of user-editable fields.

In some cases, the set of predicted issue attributes includes one or more predicted issue attributes for each of a set of issue attribute types. A user of the issue-discovery user interface may provide one or more user inputs to specify a set of actual issue attributes for the new issue, based on the predicted issue attributes and/or other attributes selected or provided by the user. In some cases, the issue-discovery user interface may allow a user to specify one or more new issue groups for creation in the issue-tracking platform. The issue-discovery user interface may transmit the set of actual issue attributes to the issue-tracking platform for creation of the new issue in the issue-tracking platform.

To determine matching or most similar issue groups or issue attributes in the examples described above, the issue-discovery service may determine a similarity score between compared data items, and may determine that the items "match" if the similarity score meets or exceeds a predetermined similarity threshold. Additionally or alternatively, the issue-discovery service may select a number of data items that have the highest similarity score (e.g., the top 1, top 3, top 5, etc.) as "matches".

The issue-discovery service may transmit the set of determined issue attributes to the issue-tracking platform for creation of the new issue in the issue-tracking platform. Additionally or alternatively, the issue-discovery service may determine a set of predicted issue attributes for the new issue based on the chat channel data and the issue configuration data and presents the set of predicted issue attributes in an issue-discovery user interface provided by the issue-discovery service. The issue-discovery user interface may be instantiated on the client device providing the chat user interface in response to the user input provided via the user input element. The issue-discovery user interface may be integrated with or separate from the chat user interface.

As discussed above, the issue-discovery service may facilitate creating new issues and/or issue groups in the issue-tracking platform based on activity in the messaging platform. Additionally or alternatively, the issue-discovery service may facilitate modifying existing issues and/or issue groups in the issue-tracking platform. For example, the issue-discovery service may determine one or more existing issues and/or issue groups based on the chat channel data and/or the issue configuration data, and present users with options to specify modifications to the issues or issue groups using the issue-discovery user interface.

As noted above, the issue-tracking platform may manage work items or "issues" (e.g., tasks, events, or other work items). Example issue-tracking platforms include JIRA™ and JIRA SERVICE DESK™, which are commercially available from ATLASSIAN™. Issues may be organized into one or more issue groups, which may correspond to projects or project groups (e.g., software development or support projects, internal projects, external or client-facing projects, events, product roadmaps, etc.), divisions or groups within an organization (e.g., business groups, teams, etc.), and the like. In various embodiments, the issue-tracking platform may include different types of issue groups. In some cases, one or more types of issue groups may be used to group issues based on their relation to a particular project, group of projects, or portion of a project. Additionally or alternatively, one or more types of issue groups may be used to group issues based on requirements or requests written from the perspective of an end user. Example issue groups include THEMES, INITIATIVES, EPICS, STORIES, PROJECTS, and SPRINTS in JIRA™.

The messaging platform may provide functionality for receiving and delivering messages using any of a variety of messaging protocols, including web-chat (e.g., a chat application of a web-page hosted by the communication system), e-mail, extensible messaging and presence protocol (XMPP), short message service (SMS) texting, multimedia messaging service (MMS), mobile chat (e.g., via an application installed on a user device, chat services provided by gaming consoles, and application program interfaces (APIs)

that third party application can use to send messages, among others). Examples of the messaging platform include SLACK™, GOOGLE HANGOUTS™, DISCORD™, MICROSOFT TEAMS™, and the like.

Messages may include any suitable content, including text, graphics, images, videos, audio data, documents or other files, and the like. Each chat channel may include associated chat channel data, which may include chat channel participants (e.g., users of the messaging platform assigned to the chat channel), messages and other content of the chat channel, and the like. In some cases, chat channel data for a chat channel includes one or more issues or issue groups of the issue-tracking platform associated with the chat channel.

These foregoing and other embodiments are discussed below with reference to FIGS. 1-5. However, those skilled in the art will readily appreciate that the detailed description given herein with respect to these figures is for explanation only and should not be construed as limiting.

FIG. 1A depicts an example system 100 that includes an issue-discovery service 130 configured to create a new issue in an issue-tracking platform 120 based on messaging activity of a messaging platform 110. The system 100 may include one or more client devices 102, which may be used to access the messaging platform 110, the issue-tracking platform 120, and/or the issue-discovery service 130. The system 100 may additionally include one or more networks 104 that enable communication between the various components of the system 100.

The client devices 102 can include one or more physical or virtual computing elements such as a processor, a working memory, and a persistent data store or persistent memory. In many embodiments, computer code defining an instance of one or more client applications can be stored at least in part in a persistent memory. Upon request, a processor of the client device 102 can be leveraged to access the persistent memory and load at least a portion of that computer code into the working memory, thereby at least partially instantiating an instance of a client application.

The client application(s) can be configured to generate or otherwise render one or more graphical user interfaces which can be shown on a display of the client device 102. The graphical user interface(s), can be configured to display any suitable information related to the system 100, including the chat user interface of the messaging platform 110, the issue-tracking user interface of the issue-tracking platform 120, and/or the issue-discovery user interface of the issue-discovery service 130.

The client device 102 can be any suitable electronic device. In many embodiments, as noted above, the client device 102 is a mobile electronic device such as a smart phone, a tablet computer, or a laptop computing device. These are merely examples; any suitable computing device or computing resource may be configured to, in whole or in part, instantiate one or more user interfaces and/or client applications as discussed herein.

The messaging platform 110 may provide functionality for facilitating the exchange of messages in one or more messaging groups or "chat channels." The messaging platform 110 may facilitate real-time chat sessions in which a set of channel participants may exchange messages in chat channels. A chat channel may include messages (e.g., a chronologically organized stream of messages) exchanged among a group of two or more users of the messaging platform 110. The messaging platform 110 may provide a chat user interface accessible by one or more client devices 102 that allows a user of the messaging platform 110 to view chat channel data for one or more chat channels for which the user is a participant.

The chat channel data may include content associated with the chat channel (e.g., message(s) or other content identified by the user input), users associated with the chat channel, configurable settings or attributes of the chat channel (e.g., a chat channel name, description, security policy, and other structured data fields associated with the chat channel), and the like. In some cases, the chat user interface includes a chronologically organized stream of messages of a chat channel. An example chat user interface is discussed in more detail below with respect to FIGS. 3A and 3B.

The messaging platform 110 may provide functionality for receiving and delivering messages using any of a variety of messaging protocols, including web-chat (e.g., a chat application of a web-page hosted by the communication system), e-mail, extensible messaging and presence protocol (XMPP), short message service (SMS) texting, multimedia messaging service (MMS), mobile chat (e.g., via an application installed on a user device, chat services provided by gaming consoles, and application program interfaces (APIs) that third party application can use to send messages, among others). Examples of the messaging platform 110 include SLACK™, GOOGLE HANGOUTS™, DISCORD™, MICROSOFT TEAMS™, and the like. In some cases, the messaging platform may be provided as part of a system in which real-time messaging or chat is not a primary function of the application or service, including video conferencing applications and the like.

Messages may include any suitable content, including text, graphics, images, videos, audio data, documents or other files, and the like. Each chat channel may include associated chat channel data, which may include chat channel participants (e.g., users of the messaging platform 110 assigned to the chat channel), messages and other content of the chat channel, and the like. In some cases, chat channel data for a chat channel includes one or more issues or issue groups of the issue-tracking platform 120 associated with the chat channel.

As noted above, the issue-tracking platform 120 may manage work items or "issues" (e.g., tasks, events, or other work items). Example issue-tracking platforms include JIRA™ and JIRA SERVICE DESK™, which are commercially available from ATLASSIAN™. As noted herein, issues in the issue-tracking platform 120 may be tasks, events, or other work items, and may be assigned to one or more issue groups of the issue-tracking platform. The issue-tracking platform 120 may store issue configuration data related to the issues in the issue-tracking platform. Each issue is associated with a user or set of users that are responsible for performing one or more tasks or aspects of the issue.

Issue configuration data stored by the issue-tracking platform 120 may include issue attributes for existing issues stored by the issue-tracking platform, rules for configuring issues, and the like. Issue attributes may include information (e.g., structured information) corresponding to an issue and/or relating the issue to other issues or issue groups in the issue-tracking platform. Examples of issue attributes include an issue title and/or description, issue groups to which the issue is assigned, users assigned to the issue, an issue type, an issue progress or status (e.g., not started, in progress, complete, waiting, etc.), relevant dates (e.g., deadlines, creation date, milestone dates, etc.), priority information (e.g., urgent, high priority, standard priority, low priority, etc.), and/or any other information relevant to the issue. In some cases, the issue attributes include one or more chat channels (e.g., chat channel(s) of the messaging platform 110) associated with the issue and/or issue groups to which the issue is assigned.

Issues in the issue-tracking platform 120 may be organized into one or more issue groups, which may correspond to projects or project groups (e.g., software development or support projects, internal projects, external or client-facing projects, events, product roadmaps, etc.), divisions or groups within an organization (e.g., business groups, teams, etc.), and the like. Example issue groups include THEMES, INITIATIVES, EPICS, STORIES, PROJECTS, and SPRINTS in JIRA™. Issues may belong to zero issue groups, one issue group, or two or more issue groups.

Issue groups may be organized hierarchically such that a first issue group (e.g., a parent issue group) contains or is separated into one or more additional issue groups (e.g., child issue groups). For example, a first issue group may correspond to a particular team or business division of an organization, the first issue group may contain child issue group(s) corresponding to particular products or projects that the team or business division is responsible for. In some cases, there may be multiple levels in an issue group hierarchy. For example, a second issue group that is a child issue group of the first issue group in the example above may be a parent issue group with respect to additional child issue group(s) corresponding to particular features or other portions of the product or project to which the second issue group pertains. An issue group may be a parent issue group to multiple child issue groups and/or a child issue group to multiple parent issue groups.

Issues may be tasks, events, or other work items within an issue group, and may exist at any level within an issue group hierarchy. For example, an issue in the first issue group discussed above may be a task or event for determining a new project or product for the organization. The second issue group may correspond to the new project or product and be created in response to determining the new project or product. In this example, an issue in the second issue group may be determining a product roadmap for the new project. Each child issue group of the second issue group may correspond to a respective feature of the new project or product. Issues in these child issue groups may correspond to development activities for the respective feature to which they pertain.

Users of the issue-tracking platform 120 may be organized into one or more user groups. Similar to issue groups, user groups may correspond to organizations, divisions, teams, or roles within organizations, projects, features, and the like. The user group(s) to which a user is assigned may determine one or more issue groups to which the user is assigned. In some cases, users may be directly assigned to one or more issue groups, such that the user groups to which a user is assigned correspond to issue groups.

In many examples, the issue-tracking platform 120 is configured for use by a software development team to exchange information that can facilitate the completion and assignment of discrete tasks related to software development projects from creation of new user stories (e.g., user-perspective feature requests or desired functionality), through proof of concept testing, through integration testing, through release of software to one or more users, and through reporting and fixing of software errors or inefficiencies ("bugs").

As noted herein, the issue-discovery service 130 may access data from the messaging platform 110 and/or the issue-tracking platform 120 to automatically determine issue attributes for creating a new issue in the issue-tracking platform 120 based on activity in the messaging platform 110. The issue-discovery service 130 may provide or otherwise be associated with a user input element in the chat user interface or otherwise presented on a client device 102 that allows a user of the client device to identify content associated with the chat channel (e.g., one or more messages displayed in the chat user interface) for use in creating a new issue in the issue-tracking platform 120. An example user input element is discussed in more detail below with respect to FIGS. 3A and 3B.

The issue-discovery service 130 may transmit determined issue attributes to the issue-tracking platform 120 for creation of the new issue in the issue-tracking platform. Additionally or alternatively, the issue-discovery service 130 may determine predicted issue attributes for the new issue based on the chat channel data and the issue configuration data and presents the predicted issue attributes in an issue-discovery user interface provided on the client device by the issue-discovery service 130. The issue-discovery user interface may be instantiated on the client device 102 providing the chat user interface in response to the user input provided via the user input element. The issue-discovery user interface is discussed in more detail below with respect to FIG. 3C.

Figure 1B:
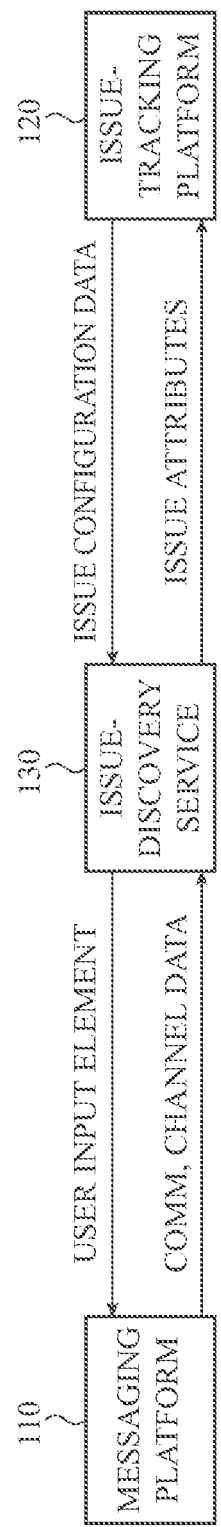
FIG. 1B depicts a simplified data flow diagram showing an example flow of data between the messaging platform and the issue-tracking platform through the issue-discovery service.

The issue-discovery service 130 may be configured to establish a data pipeline with the messaging platform 110 and/or the issue-tracking platform 120 to exchange data with these systems. The data pipeline may be any suitable connection for data to flow between the systems, including application programming interface (API) calls, webhooks, and the like. FIG. 1B depicts a simplified data flow diagram showing an example flow of data between the messaging platform 110 and the issue-tracking platform 120 through the issue-discovery service 130.

As shown in FIG. 1B, the issue-discovery service 130 may provide a user input element to the messaging platform 110 that allows a user of the client device 102 to identify, in the chat user interface, content associated with the chat channel (e.g., one or more messages displayed in the chat user interface) for use in creating a new issue in the issue-tracking platform 120. The issue-discovery service 130 may be capable of detecting inputs to the chat user interface using the user input element and/or accessing content identified using the user input element in a variety of ways, including via an application programming interface provided by the messaging platform 110 and/or other data pipeline(s) between the two systems. In some cases, the messaging platform 110 may notify the issue-discovery service 130 when a user input is received using the user input element. The notification from the messaging platform 110 may include the content identified by the user input or an identifier thereof such that the issue-discovery service 130 may otherwise access the content via the data pipeline with the messaging platform 110.

As shown in FIG. 1B, the issue-discovery service 130 may receive or otherwise access chat channel data from the messaging platform 110 for use in determining issue attributes. Additionally or alternatively, the issue-discovery service 130 may receive or otherwise access issue configuration data from the issue-tracking platform 120 for use in determining issue attributes. Once issue attributes are determined, the issue-discovery service 130 may provide the issue attributes to the issue-tracking platform 120 for creation of a new issue or modification of an existing issue.

The example shown in FIG. 1B is for illustrative purposes and is not meant to be limiting. The data exchanged between the issue-discovery service 130 and the messaging platform 110 and the issue-discovery service 130 and the issue-tracking platform 120 may include other information beyond the examples discussed in FIG. 1B. For example, in some cases, the issue-discovery service 130 provides predicted issue attributes for a new issue and/or graphical elements related thereto to the messaging platform 110 for presentation in the chat user interface rather than presenting the predicted issue attributes in a separate issue-discovery user interface. As another example, in some cases, the issue-discovery service 130 does not provide the user input element to the messaging platform 110. In such a case, the user input element may be a user interface element that is already in the chat user interface and/or provided by the messaging platform or another source.

In some cases, the issue-discovery service 130 is a plugin or integration that is executing with the messaging platform 110 and/or the issue-tracking platform 120. In various embodiments, the issue-discovery service 130 may share data through shared memory or directly through API calls. Additionally or alternatively, aspects of the issue-discovery service 130 may share hardware components with aspects of the messaging platform 110 and/or the issue-tracking platform 120.

Returning to FIG. 1A, the network 104 may include any suitable combination of wired and/or wireless networks suitable for facilitating communication between the elements of the system 100, including, but not limited to, local area networks, wide area networks, personal area networks, cellular networks utilizing Wi-Fi, Bluetooth, IR, Ethernet connections, and the like.

The messaging platform 110, the issue-tracking platform 120, and/or the issue-discovery service 130, however configured or used by a team of individuals or an organization, may be implemented with a client-server architecture in which a host server or service of the respective system exchanges requests and responses (which may comply with a communication protocol such as HTTP, TCP, UDP, and the like), with one or more client devices 102, each of which may be operated by a user of the system 100. In other cases, event-driven architectures may be used. In this manner, a host server of a respective system can serve information to each client device 102, and in response, each client device can render a graphical user interface on a display to present that information to the user of that respective client device.

It is appreciated that the foregoing embodiment depicted in FIGS. 1A and 1B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each device or system of the system 100 of FIG. 1A can be implemented in a number of suitable ways. The client device 102, the messaging platform 110, the issue-tracking platform 120, and/or the issue-discovery service 130 may each include one or more purpose-configured components, which may be either software or hardware. In particular, it may be appreciated that although these functional elements are identified as separate and distinct devices (e.g., servers) that can each include allocations of physical or virtual resources (identified in the figure as the resource allocations 112, 122, and 132 respectively), such as one or more processors, memory, and/or communication modules (e.g., network connections and the like), such an implementation is not required. More generally, it may be appreciated that the various functions described herein can be performed by any suitable physical hardware, virtual machine, containerized machine, or any combination thereof. An example implementation of hardware for implementing the system 100 is described below with respect to FIG. 5.

Figure 2:
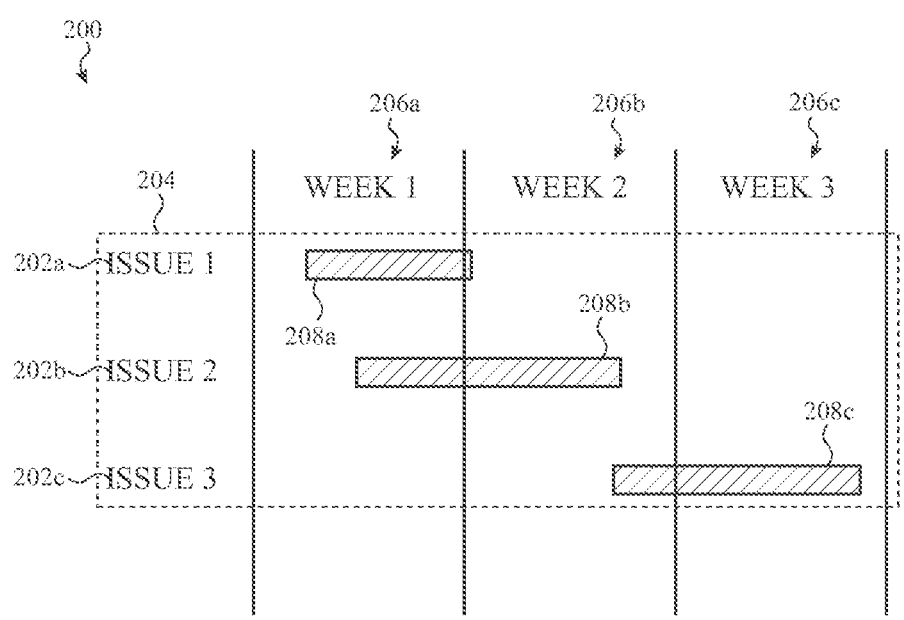
FIG. 2 is a visualization of a timeline for a group of issues managed by the is sue-tracking platform.
Figure 3A:
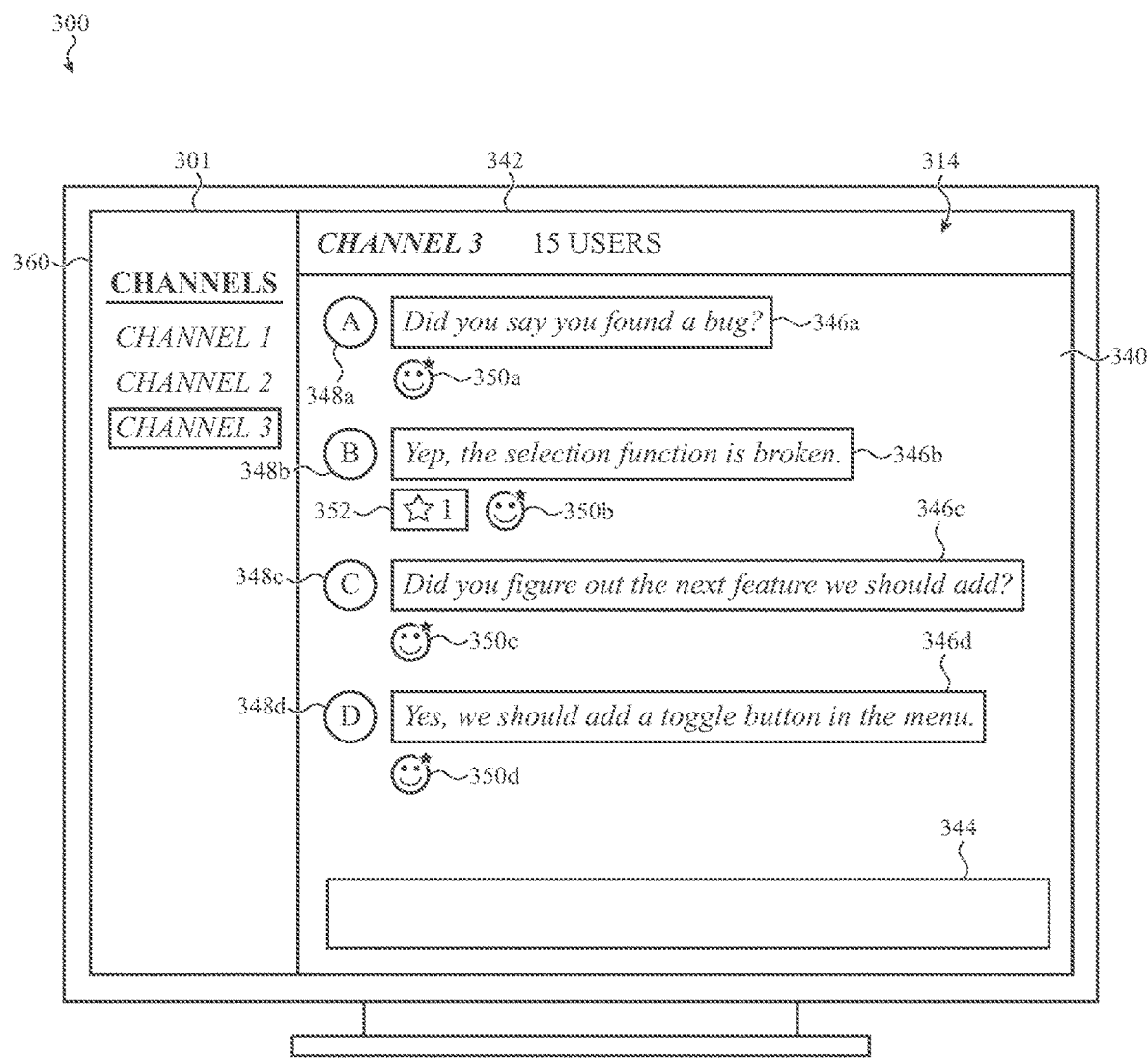
FIGS. 3A-3B depict an example chat user interface of a messaging platform provided on a client device.
Figure 3B:
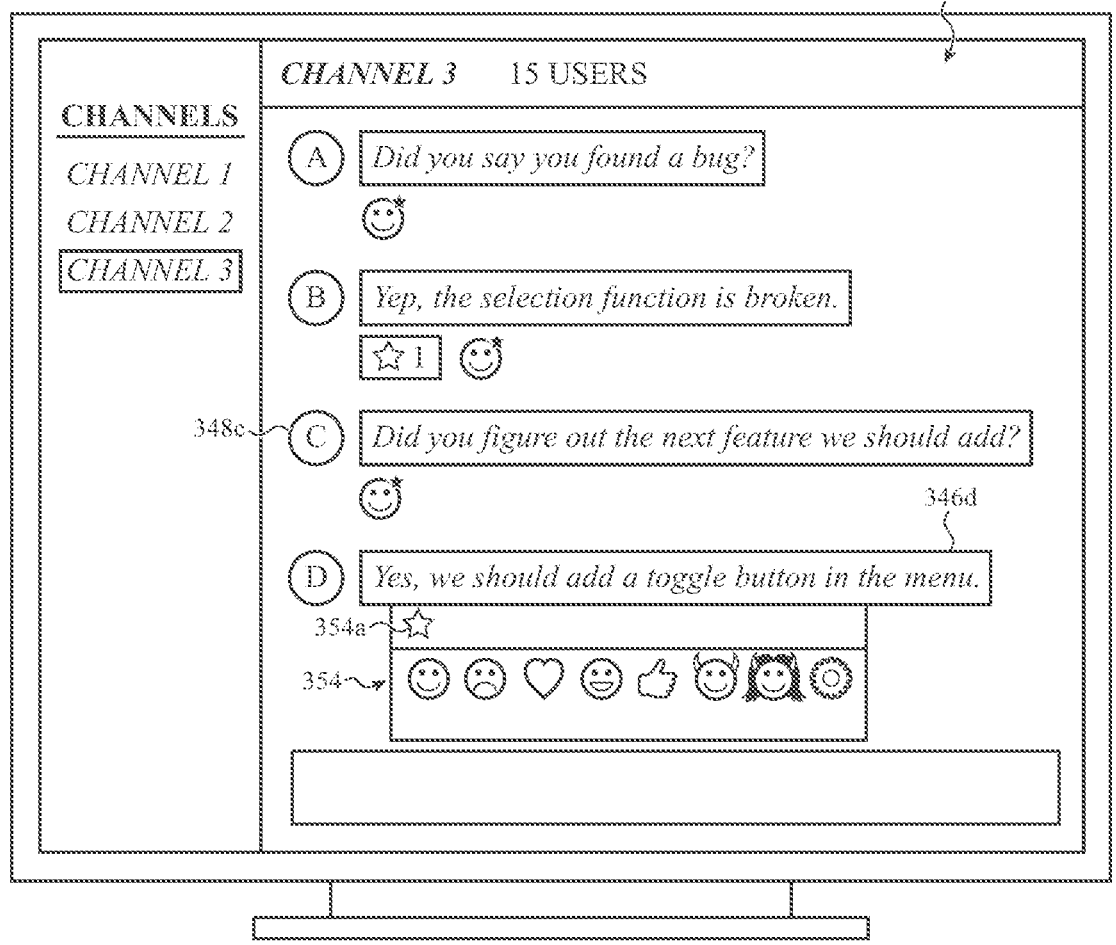

FIG. 2 is a visualization 200 of a timeline depicting example issues 202a-c managed by the issue-tracking platform 120. The visualization 200 may be available for viewing and/or modification by users via the issue-tracking user interface discussed herein. The visualization 200 depicts various issue attributes of the issues 202a-c. As shown in FIG. 2, the issues 202a-c may belong to a common issue group (e.g., a project), as indicated by the box 204 around the issues. The visualization 200 may display a timeline of the issues 202a-c across one or more time periods 206a-c. The issue attributes of each issue 202a-c may include relevant dates, including a start date and a deadline that may be used to determine a respective issue duration indicator 208a-c. The visualization 200 is an example illustration of issues and issue attributes of the issue-tracking platform 120, and is not meant to be limiting. In various embodiments, the issues may be progressed over time or by completion of various tasks performed over the lifecycle of an issue FIGS. 3A-3B depict an example chat user interface 314 of a messaging platform (e.g., messaging platform 110) provided on a client device 300. The chat user interface 314 may be associated with a real-time chat session in a chat channel of the messaging platform, and may be provided on the client device 300 as part of a graphical user interface of the client device. The chat user interface 314 may be provided on a display 301 of the client device 300. The client device 300 may be similar to the client devices (e.g., client device 102) discussed herein.

The example chat user interface 314 may include a message region 340, an information region 342, and a channel selection region 360. The message region may include one or more messages 346a-d (e.g., a chronologically organized stream of messages) associated with a chat channel and a text entry region 344 for composing new messages for the chat channel. The information region 342 may include chat channel data of the chat channel, such as a chat channel name, users associated with the chat channel, and the like. The channel selection region 360 may include one or more chat channels to which a user is assigned, and allow the user to switch between the chat channels. For example, in FIG. 3A, a user has selected a chat channel named 'CHANNEL 3' for display in the message region 340, so messages and other chat channel data from that chat channel are displayed in the information region 342 and the message region 340.

Each message 346a-d may include an associated user element 348a-d, which identifies a user who sent the message. The user elements 348a-d may be any graphical element or combination of graphical elements for identifying a user, including images, icons, text (e.g., a user's name, initials, user identifier, etc.), and the like.

The chat user interface 314 may allow users to assign indicators (e.g., indicator 352) to messages 346a-d and/or groups of messages presented in the chat user interface. Indicators may be graphical elements or combinations of graphical elements (e.g., emoji, symbols, icons, text, and the like). Users may assign indicators to messages 346a-d to react to message(s). For example, a user may select a thumbs up, smiley, or heart to express appreciation or agreement with a message. Additionally or alternatively, users may assign indicators to messages 346a-d to create or modify issues in an issue-tracking platform using an issue-discovery service.

The chat user interface 314 may include one or more indicator assignment elements (e.g., indicator assignment elements 350a-d), which allows a user of the chat user interface to assign indicators to individual messages 346a-d and/or groups of messages. In some cases, as shown in FIG. 3A, each message 346a-d may have an associated indicator assignment element 350a-d, which allows a user to assign indicators to that particular message. In some cases, in response to the user selecting an indicator assignment element 350a-d, the chat user interface 314 may display one or more indicators that a user may assign to the corresponding message 346a-d. In some cases, the one or more indicators are presented in the form of an array (e.g., an array of emoji icons). In some cases, the array includes a user input element (e.g., an issue-creation emoji icon 354a) provided by the issue-discovery service that may be used to create or modify one or more issues in an issue-tracking platform. The user may select the user input element to identify the corresponding message (346d in this example) for use in creating or modifying the one or more issues.

Figure 3C:
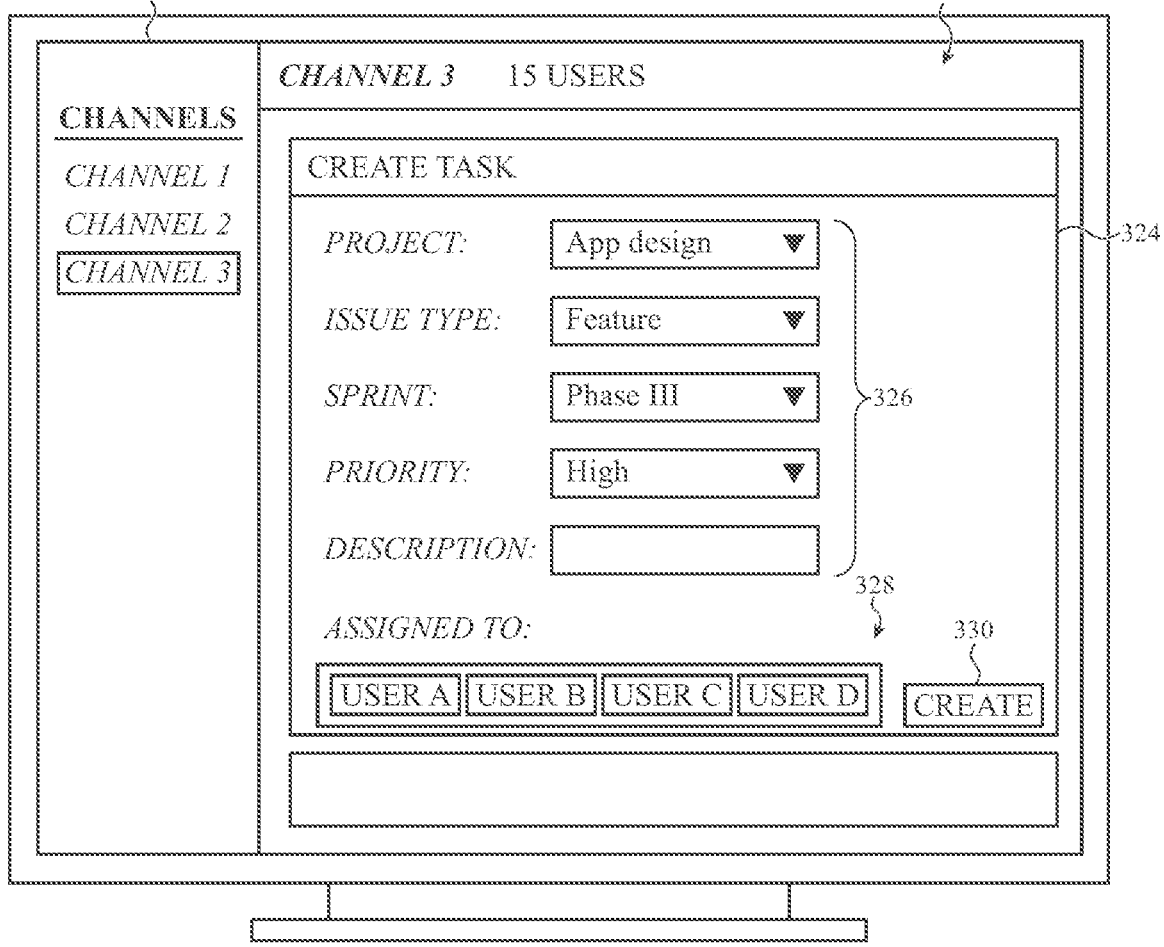
FIG. 3C depicts an example issue-discovery user interface of an issue-discovery service provided on the client device.

As described herein, in response to the user selecting the user input element 354a, the issue-discovery service may determine issue attributes for the new issue (or modified issue). The issue-discovery service may transmit the issue attributes to the issue-tracking platform. In some cases, the issue-discovery service presents predicted issue attributes in an issue-discovery user interface provided on the client device 300. FIG. 3C depicts an example issue-discovery user interface 324 of an issue-discovery service (e.g., issue-discovery service 130) provided on the client device 300. The issue-discovery user interface 324 may be integrated with (e.g., in the same window or application) the chat user interface 314, or it may be a separate window or application from the chat user interface.

The issue-discovery user interface 324 may include one or more user-editable fields 326, 328 corresponding to issue attributes for the new issue. The user-editable fields 326, 328 may be prepopulated by one or more predicted issue attributes. For example a user-editable field 328 may indicate one or more users assigned to the issue. Similarly, user-editable fields 326 may indicate additional predicted issue attributes (e.g., issue groups, issue type, priority, narrative/description, etc.). In some cases, the issue-discovery user interface may allow users to provide user input(s) to the user-editable fields 326, 328 to modify the predicted issue attributes. For example, the predicted issue attributes may be presented in drop-down menus that allow a user to select from a list of predicted attributes for each attribute type and/or provide a custom input. The issue-discovery user interface 324 may further include a create element 330, selection of which causes the issue-discovery service to transmit the selected issue attributes (e.g., actual issue attributes) to the issue-tracking platform to create or modify an issue.

Figure 4:
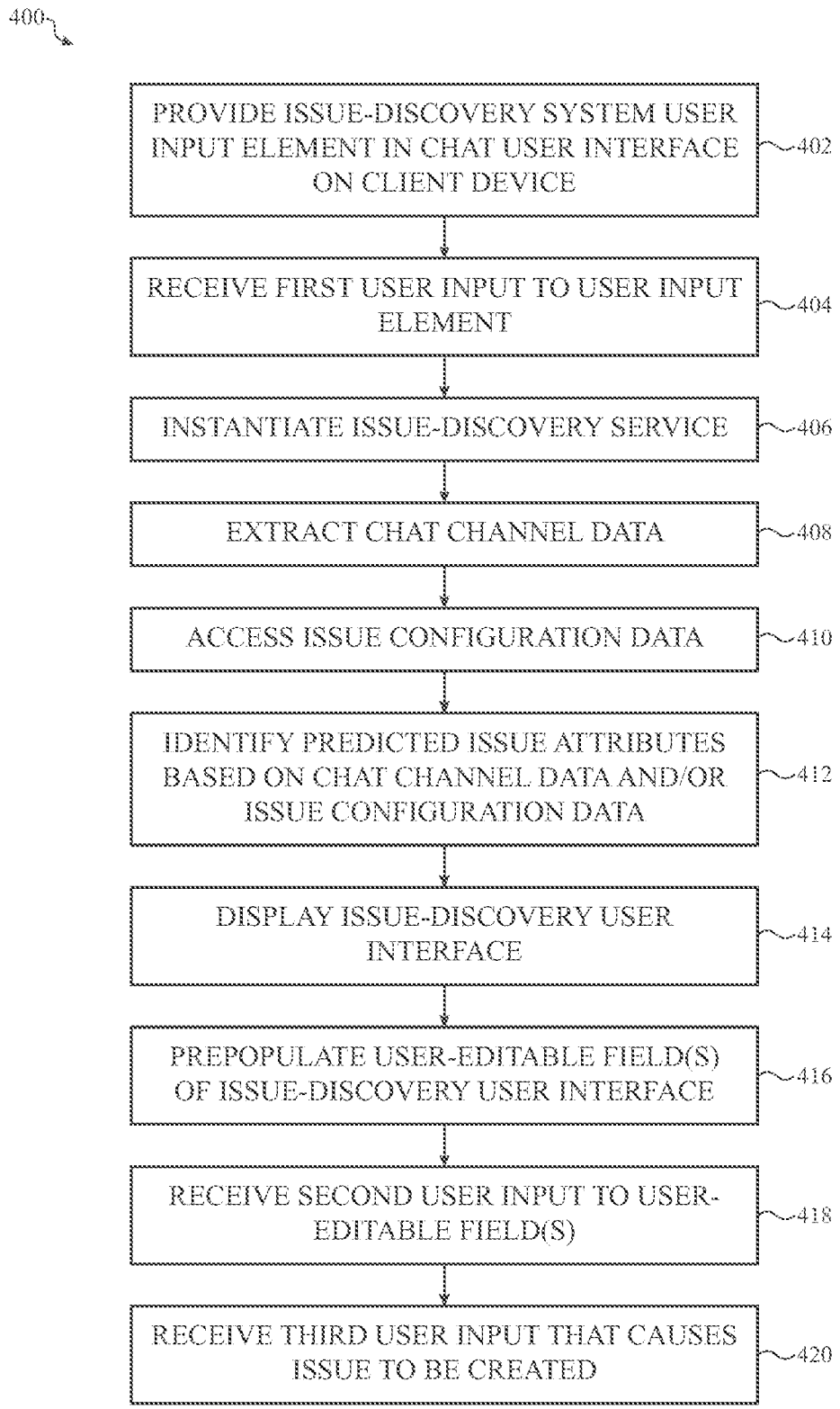
FIG. 4 is a flowchart depicting example operations of a method for using an issue-discovery service to create a new issue in an issue-tracking platform based on messaging activity of a messaging platform.

FIG. 4 is a flowchart depicting example operations of a method 400 for using an issue-discovery service to create a new issue in an issue-tracking platform based on messaging activity of a messaging platform. The operations of the method 400 may be performed by an issue-discovery service (e.g., issue-discovery service 130) and/or a messaging platform.

At operation 402, the issue-discovery service provides a user input element (e.g., user input element 354a) in the chat user interface (e.g., chat user interface 314) on a client device (e.g., client devices 102, 300). The chat user interface may be provided by a messaging platform (e.g., messaging platform 110), and may display chat channel data (e.g., messages and other data) for one or more chat channels. In some cases, the user input element may be an issue-creation emoji icon that may be selected by a user to provide a user input. In some cases, the issue-creation emoji icon may be presented to a user in an array of emoji icons as shown in FIG. 3B. In some cases, the chat user interface may display the array of emoji icons in response to receiving a user input, such as a selection of an indicator assignment element (e.g., indicator assignment elements 350a-d).

At operation 404, the chat user interface may receive a first user input to the user input element, such as a user selecting an issue-creation emoji icon as discussed with respect to FIGS. 3A-3C. The first user input may identify content (e.g., a message) for use in creating a new issue in an issue-tracking platform (e.g., issue-tracking platform 120). In some cases, the messaging platform may notify the issue-discovery service when a user input is received using the user input element. In various embodiments, the issue-discovery service may be capable of detecting inputs to the chat user interface using the user input element and/or accessing content identified using the user input element in a variety of ways, including via an application programming interface provided by the messaging platform and/or other data pipeline(s) between the two systems.

At operation 406, an instance of the issue-discovery service is instantiated in response to receiving the user input. Each of the issue-discovery service, the messaging platform, and the issue-tracking platform can be configured to operate as an instance of software independently instantiated over a server system (e.g., the system 100 of FIG. 1A). In some cases, one or more of the issue-discovery service, the messaging platform, and the issue-tracking platform may be instantiated over the same physical resources (e.g., memory, processor, and so on), whereas in other cases, each of the issue-discovery service, the messaging platform, and the issue-tracking platform are instantiated over different, independent, and distinct physical hardware.

At operation 408, the issue-discovery service extracts chat channel data of the chat channel. The chat channel data may include a portion of content from the real-time chat session. The issue-discovery service may access chat channel data of the messaging platform to extract the content. The issue-discovery service may be configured to establish a data pipeline with the messaging platform to access the chat channel data. The data pipeline may be any suitable connection for data to flow between the systems, including application programming interface (API) calls, webhooks, and the like. The chat channel data may include content associated with the chat channel (e.g., message(s) or other content identified by the user input), users associated with the chat channel, configurable settings or attributes of the chat channel (e.g., a chat channel name, description, security policy, and other structured data fields associated with the chat channel), and the like. In some cases, the chat channel data includes the content of the message identified by the user input received in operation 404.

At operation 410, the issue-discovery service accesses issue configuration data of the issue-tracking platform. The issue-discovery service may be configured to establish a data pipeline with the issue-tracking platform to access the issue configuration data. The data pipeline may be any suitable connection for data to flow between the systems, including application programming interface (API) calls, webhooks, and the like. The issue configuration data may include issue attributes of existing issues in the issue-tracking platform, rules for configuring new issues, and the like.

At operation 412, the issue-discovery service identifies one or more predicted issue attributes based on the chat channel data and/or the issue configuration data. The issue-discovery service may determine issue attributes for the new issue in a variety of ways. In some cases, the issue-discovery service determines one or more issue groups for the new issue based on comparing chat channel data to issue configuration data. For example, the issue-discovery service may compare a channel name or description to issue group names and/or issue titles within issue groups. The issue-discovery service may select one or more issue groups having issue group names and/or issue titles that most closely match the compared channel name or description. The issue-discovery service may compare users of the chat channel to users of issue groups, and may select as a determined issue group an issue group with a set of associated users that most closely matches the users associated with the chat channel. Similarly, the issue-discovery service may determine users of the issue-tracking platform to assign to the new issue based on the participants in the chat channel. For example, the determined predicted user attributes may include a set of issue-tracking platform user identifiers. The issue-discovery service may determine issue-tracking platform user identifiers associated with participants of the chat channel.

In some cases, the issue-discovery service may analyze content (e.g., messages) of the chat channel to determine issue attributes. In some cases, the issue configuration data may include keywords associated with issue groups or issues of the issue-tracking platform. The issue-discovery service may compare the contents of the chat channel to the keywords to identify one or more issue groups or other issue attributes for the new issue.

To determine matching or most similar issue groups or issue attributes in the examples described above, the issue-discovery service may determine a similarity score between compared data items, and may determine that the items "match" if the similarity score meets or exceeds a predetermined similarity threshold. Additionally or alternatively, the issue-discovery service may select a number of data items that have the highest similarity score (e.g., the top 1, top 3, top 5, etc.) as "matches".

At operation 414, the issue-discovery service displays an issue-discovery user interface (e.g., issue-discovery user interface 324) having a set of user-editable fields. The set of user-editable fields may correspond to predicted issue attributes for the new issue. As discussed herein, the issue-discovery user interface may be integrated with the chat user interface or it may be a separate user interface. The issue-discovery user interface may present information and/or accept inputs regarding the creation of the new issue.

At operation 416, the issue-discovery system prepopulates one or more user-editable fields of the set of user-editable fields using the one or more predicted issue attributes. The issue-discovery user interface may present the set of predicted issue attributes for viewing and/or modification by the user of the client device. In some cases, the set of predicted issue attributes includes one or more predicted issue attributes for each of a set of issue attribute types.

At operation 418, the issue-discovery service receives a second user input to one or more user-editable fields of the set of user-editable fields of the issue-discovery user interface. A user of the issue-discovery user interface may provide one or more user inputs to specify a set of actual issue attributes for the new issue, based on the predicted issue attributes and/or other attributes selected or provided by the user. In some cases, a user may provide a user input that includes a modification to a predicted issue attribute that is prepopulated in a user-editable field. As noted above, the predicted issue attributes may be presented in drop-down menus or other formats that allow a user to select one or more issue attributes from a list of predicted attributes for each attribute type and/or provide a custom input. The issue-discovery user interface may further include a create element, selection of which causes the issue-discovery service to transmit the selected issue attributes (e.g., actual issue attributes) to the issue-tracking platform to create or modify an issue. In some cases, the issue-discovery user interface may allow a user to specify one or more new issue groups for creation in the issue-tracking platform.

At operation 420, the issue-discovery service receives a third user input in the issue-discovery user interface, causing the new issue to be created in the issue-tracking platform. The new issue may have issue attributes that are based, at least in part, on content contained in the set of user-editable fields.

The example operations of the method 400 are for illustrative purposes and are not meant to be limiting. In various examples, methods for determining issue attributes for a new issue that are within the scope of this disclosure may include more or fewer steps, and may include the operations of the method 400 performed in different orders. For example, in some cases, the issue-discovery service provides predicted issue attributes for a new issue and/or graphical elements related thereto to the messaging platform for presentation in the chat user interface rather than presenting the predicted issue attributes in a separate issue-discovery user interface. As another example, in some cases, the issue-discovery service does not provide the user input element to the messaging platform. In such a case, the user input element may be a user interface element that is already in the chat user interface and/or provided by the messaging platform or another source.

As discussed above, the issue-discovery services described herein may facilitate creating new issues and/or issue groups in the issue-tracking platform based on activity in the messaging platform. Additionally or alternatively, the issue-discovery services described herein may facilitate modifying existing issues and/or issue groups in the issue-tracking platform. For example, the issue-discovery service may determine one or more existing issues and/or issue groups based on the chat channel data and/or the issue configuration data, and present users with options to specify modifications to the issues or issue groups using the issue-discovery user interface.

Figure 5:
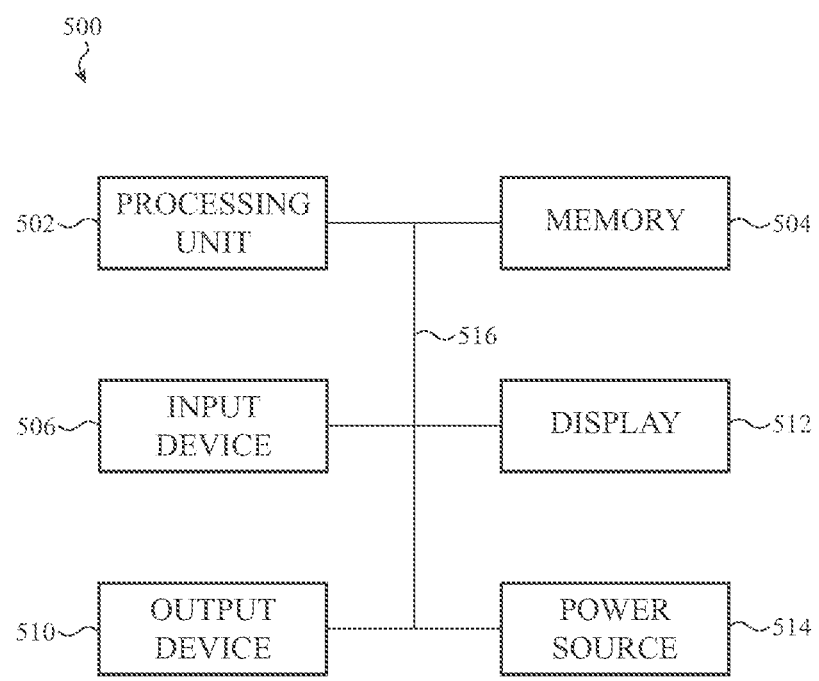
FIG. 5 illustrates a sample electrical block diagram of an electronic device that may perform the operations described herein.

FIG. 5 illustrates a sample electrical block diagram of an electronic device 500 that may perform the operations described herein. The electronic device 500 may in some cases take the form of any of the electronic devices described with reference to FIGS. 1A-4, including client devices 102, 300 and/or servers or other computing devices associated with the messaging platform 110, the issue-tracking platform 120, and/or the issue-discovery service 130. The electronic device 500 can include one or more of a display 512, a processing unit 502, a power source 514, a memory 504 or storage device, input devices 506, and output devices 510. In some cases, various implementations of the electronic device 500 may lack some or all of these components and/or include additional or alternative components.

The processing unit 502 can control some or all of the operations of the electronic device 500. The processing unit 502 can communicate, either directly or indirectly, with some or all of the components of the electronic device 500. For example, a system bus or other communication mechanism 516 can provide communication between the processing unit 502, the power source 514, the memory 504, the input device(s) 506, and the output device(s) 510.

The processing unit 502 can be implemented as any electronic device capable of processing, receiving, or transmitting data or instructions. For example, the processing unit 502 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 500 can be controlled by multiple processing units. For example, select components of the electronic device 500 (e.g., an input device 506) may be controlled by a first processing unit and other components of the electronic device 500 (e.g., the display 512) may be controlled by a second processing unit, where the first and second processing units may or may not be in communication with each other.

The power source 514 can be implemented with any device capable of providing energy to the electronic device 500. For example, the power source 514 may be one or more batteries or rechargeable batteries. Additionally or alternatively, the power source 514 can be a power connector or power cord that connects the electronic device 500 to another power source, such as a wall outlet.

The memory 504 can store electronic data that can be used by the electronic device 500. For example, the memory 504 can store electronic data or content such as, for example, audio and video files, documents and applications, device settings and user preferences, timing signals, control signals, and data structures or databases. The memory 504 can be configured as any type of memory. By way of example only, the memory 504 can be implemented as random access memory, read-only memory, Flash memory, removable memory, other types of storage elements, or combinations of such devices.

In various embodiments, the display 512 provides a graphical output, for example associated with an operating system, user interface, and/or applications of the electronic device 500 (e.g., a chat user interface, an issue-tracking user interface, an issue-discovery user interface, etc.). In one embodiment, the display 512 includes one or more sensors and is configured as a touch-sensitive (e.g., single-touch, multi-touch) and/or force-sensitive display to receive inputs from a user. For example, the display 512 may be integrated with a touch sensor (e.g., a capacitive touch sensor) and/or a force sensor to provide a touch- and/or force-sensitive display. The display 512 is operably coupled to the processing unit 502 of the electronic device 500.

The display 512 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 512 is positioned beneath and viewable through a cover that forms at least a portion of an enclosure of the electronic device 500.

In various embodiments, the input devices 506 may include any suitable components for detecting inputs. Examples of input devices 506 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 506 may be configured to detect one or more particular types of input and provide a signal (e.g., an input signal) corresponding to the detected input. The signal may be provided, for example, to the processing unit 502.

As discussed above, in some cases, the input device(s) 506 include a touch sensor (e.g., a capacitive touch sensor) integrated with the display 512 to provide a touch-sensitive display. Similarly, in some cases, the input device(s) 506 include a force sensor (e.g., a capacitive force sensor) integrated with the display 512 to provide a force-sensitive display.

The output devices 510 may include any suitable components for providing outputs. Examples of output devices 510 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 510 may be configured to receive one or more signals (e.g., an output signal provided by the processing unit 502) and provide an output corresponding to the signal.

In some cases, input devices 506 and output devices 510 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 502 may be operably coupled to the input devices 506 and the output devices 510. The processing unit 502 may be adapted to exchange signals with the input devices 506 and the output devices 510. For example, the processing unit 502 may receive an input signal from an input device 506 that corresponds to an input detected by the input device 506. The processing unit 502 may interpret the received input signal to determine whether to provide and/or change one or more outputs in response to the input signal. The processing unit 502 may then send an output signal to one or more of the output devices 510, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A method for creating a new issue for an issue-tracking platform during a real-time chat session, the method comprising:

during the real-time chat session in a chat channel, receiving a first user input causing display of a floating window comprising a plurality of emoji-insertion emoji icons and an issue-creation emoji icon;

in response to receiving a first user selection of an emoji-insertion emoji icon of the plurality of emoji-insertion emoji icons, inserting an emoji icon in a message region;

in response to receiving a second user selection of the issue-creation emoji icon, instantiating an instance of an issue-discovery service;

extracting, by the issue-discovery service, chat channel data comprising data extracted from the real-time chat session;

identifying one or more predicted issue attributes for the new issue to be created in the issue-tracking platform, the one or more predicted issue attributes identified by identifying issue data of one or more existing issues managed by the issue-tracking platform, the identified issue data matching at least a portion of the data extracted from the real-time chat session;

displaying, during the real-time chat session, an issue-discovery user interface having a set of user-editable fields;

prepopulating a first user-editable field using the one or more predicted issue attributes;

receiving a second user input in one or more user-editable fields of the set of user-editable fields; and in response to receiving a third user input in the issue-discovery user interface, causing the new issue to be created in the issue-tracking platform, the new issue having issue attributes that are based, at least in part, on content contained in the set of user-editable fields.

2. The method of claim 1, wherein:

the one or more predicted issue attributes comprise a set of issue-tracking platform user identifiers; and determining the set of issue-tracking platform user identifiers comprises:
   determining one or more chat channel participants from the data extracted from the real-time chat session; and
   identifying one or more issue-tracking platform user identifiers that correspond to the one or more chat channel participants.

3. The method of claim 1, wherein:

the issue-tracking platform is configured to manage a set of issues organized into a set of issue groups; and the one or more predicted issue attributes comprise one or more issue groups of the set of issue groups.

4. The method of claim 3, wherein:

the set of issues of the issue-tracking platform are tasks of a software development team; and the one or more issue groups are software development projects assigned to the software development team.

5. The method of claim 1, wherein:

the chat channel comprises a chronologically organized stream of messages;

the second user selection of the issue-creation emoji icon corresponds to a message of the chronologically organized stream of messages; and the data extracted from the real-time chat session includes contents of the message.

6. The method of claim 5, wherein:

the issue-tracking platform is configured to manage a set of issues organized into a set of issue groups;

the one or more predicted issue attributes comprise one or more issue groups of the set of issue groups; and identifying the one or more predicted issue attributes comprises identifying the one or more issue groups using the contents of the message.

7. The method of claim 5, wherein the one or more predicted issue attributes comprise an issue description comprising the contents of the message.

8. A computer system for creating a new issue for an issue-tracking platform during a real-time chat session, the computer system comprising a processor configured to execute instructions stored on a computer memory, the instructions for:

during the real-time chat session in a chat channel, receiving a first user input causing display of a floating window comprising a plurality of emoji-insertion emoji icons and an issue-creation emoji icon;

in response to receiving a first user selection of an emoji-insertion emoji icon of the plurality of emoji-insertion emoji icons, inserting an emoji icon in a message region;

in response to receiving a second user selection of the issue-creation emoji icon, instantiating an instance of an issue-discovery service;

extracting, by the issue-discovery service, chat channel data comprising data extracted from the real-time chat session;

identifying one or more predicted issue attributes for the new issue to be created in the issue-tracking platform, the one or more predicted issue attributes identified by identifying issue data of one or more existing issues managed by the issue-tracking platform, the identified issue data matching at least a portion of the data extracted from the real-time chat session;

displaying, during the real-time chat session, an issue-discovery user interface having a set of user-editable fields;

prepopulating a first user-editable field using the one or more predicted issue attributes;

receiving a second user input in one or more user-editable fields of the set of user-editable fields; and in response to receiving a third user input in the issue-discovery user interface, causing the new issue to be created in the issue-tracking platform, the new issue having issue attributes that are based, at least in part, on content contained in the set of user-editable fields.

9. The computer system of claim 8, wherein:

the one or more predicted issue attributes comprise a set of issue-tracking platform user identifiers; and determining the set of issue-tracking platform user identifiers comprises:
   determining one or more chat channel participants from the data extracted from the real-time chat session; and
   identifying one or more issue-tracking platform user identifiers that correspond to the one or more chat channel participants.

10. The computer system of claim 8, wherein:

the issue-tracking platform is configured to manage a set of issues organized into a set of issue groups; and the one or more predicted issue attributes comprise one or more issue groups of the set of issue groups.

11. The computer system of claim 8, wherein:

the set of issues of the issue-tracking platform are tasks of a software development team; and the one or more issue groups are software development projects assigned to the software development team.

12. The computer system of claim 8, wherein:

the chat channel comprises a chronologically organized stream of messages;

the second user selection of the issue-creation emoji icon corresponds to a message of the chronologically organized stream of messages; and the data extracted from the real-time chat session includes contents of the message.

13. The computer system of claim 12, wherein:

the issue-tracking platform is configured to manage a set of issues organized into a set of issue groups;

the one or more predicted issue attributes comprise one or more issue groups of the set of issue groups; and identifying the one or more predicted issue attributes comprises identifying the one or more issue groups using the contents of the message.

14. The computer system of claim 12, wherein the one or more predicted issue attributes comprise an issue description comprising the contents of the message.

* * * * *